Jan. 11, 1927.
D. H. DONACHY
AUTOMOBILE WINDOW
Filed Dec. 7, 1925
1,614,189
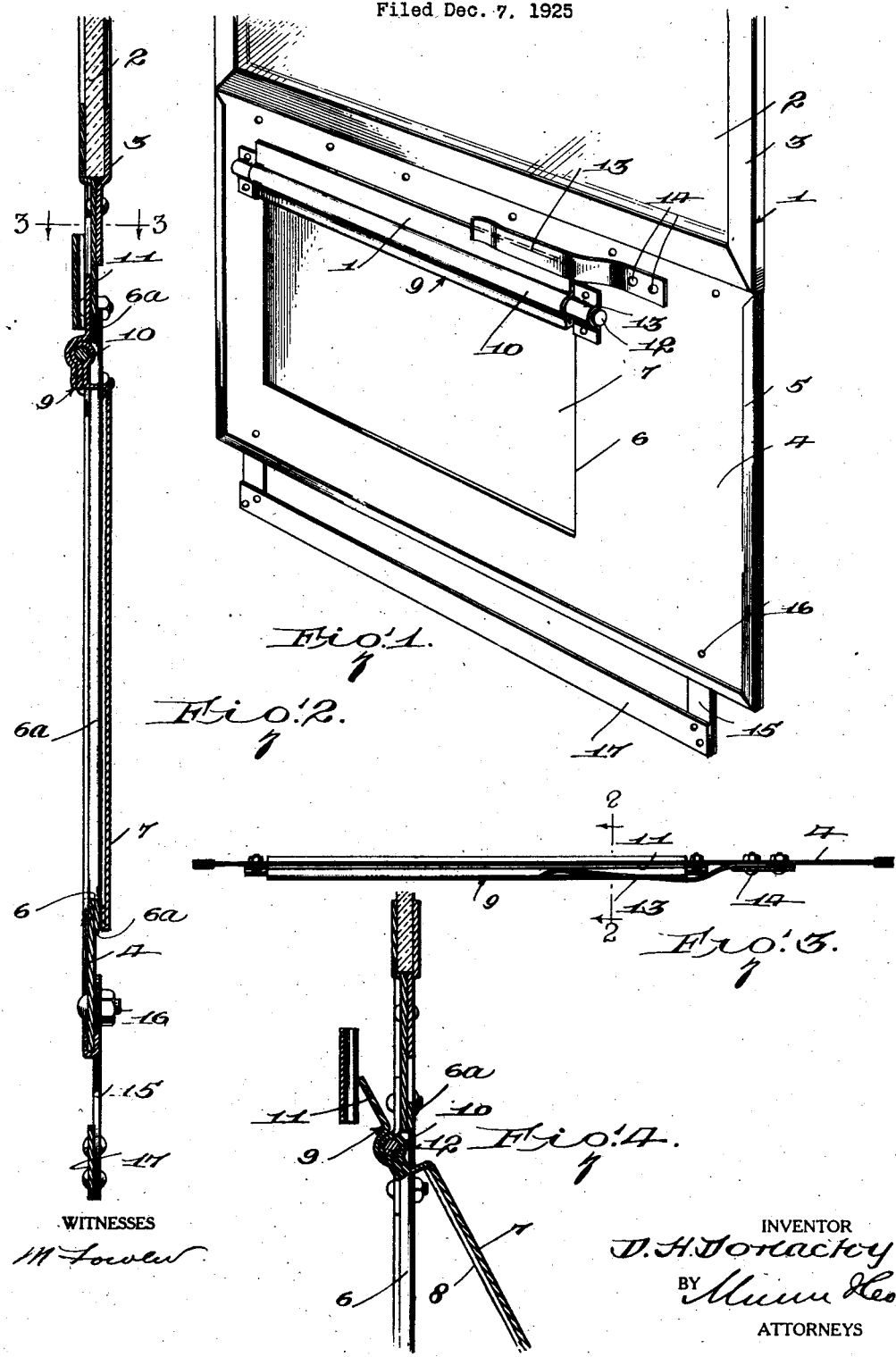
WITNESSES
INVENTOR
D. H. Donachy
BY
ATTORNEYS Patented Jan. 11, 1927.

1,614,189

UNITED STATES PATENT OFFICE.

DARWIN H. DONACHY, OF WILLIAMSPORT, PENNSYLVANIA.

AUTOMOBILE WINDOW.

Application filed December 7, 1925. Serial No. 73,850.

This invention relates to an improvement in windows for automobiles or other vehicles, and aims to provide a window which enables the driver of the car to carry out the hand signalling movements in accordance with the traffic laws without subjecting the driver to disagreeable exposure to wind, rain, snow, or the like.

A further object is to provide a device of this character which is of simple and durable construction, which will not vibrate or chatter when the automobile is running and which may be manufactured and installed at a comparatively slight expense.

Other objects and advantages reside in certain novel features of the construction, arrangement and combination of parts which will be hereinafter more fully described and particularly pointed out in the appended claim, reference being had to the accompanying drawings forming a part of this specification, and in which:—

Figure 1 is a perspective view showing one embodiment of the invention,

Figure 2 is a view in vertical section on the line 2—2 of Figure 3,

Figure 3 is a view in horizontal section on the line 3—3 of Figure 2, and

Figure 4 is a fragmentary view similar to Figure 2 but showing a different position of parts.

Referring to the drawings, the numeral 1 designates a window for an automobile or other vehicle which has a glass pane 2 suitably mounted in a frame 3. The present invention provides a rigid (and preferably of metal) panel 4 which is secured to the window framing below the same and in vertical alignment therewith. The edges of the panel are reinforced by bending back the metal thereof, as indicated at 5. The panel 4 has an opening 6 therein. The portions of the panel which surround the opening 6 have their marginal edges bent back, as shown at 6ª, in Fig. 2, to strengthen the structure, and to eliminate sharp edges. This opening 6 is normally closed by means of a rigid closure plate 7 preferably made of metal and having its edges reinforced by bent-back flanges 8. The plate 7 has integral therewith a hanger, designated generally at 9. The hanger is formed with a hinge bearing 10 and an upstanding flange 11. The hinge bar 10 receives a hinge rod 12 carried by brackets 13' fastened to the panel 4. The hanger 9 has a transverse extent just less than the opening 6 and this is less than the extent of the closure plate 7, the closure plate 7 being of sufficient size to have its edges overlap the portions of the panel 4 which surround the opening 6. With this arrangement pressure applied to the inner face of the flange 11 tends to swing the closure plate 7 to closed position such as shown in Figure 2. For the purpose of supplying a yieldable pressure of this character a spring member 13 is provided and has one end fastened, as at 14, to the panel 4, the major portion of the spring member 13 is free and engages the flange 11, as shown in Figures 1, 2 and 4. It is to be understood that the flange 11 and its coacting spring are positioned at the inner face of the panel 4 while the closure plate 7 is positioned at the outer face thereof.

Below the panel 4 depending bars 15 extend, the bars 15 being fastened, as at 16, to the panel and being connected by a transverse bar 17. The bar 17 facilitates the connection of the lowering and raising mechanism to the window structure.

In use when the window is in closed position the opening 6 is at about the level of the hand so that the operator of the machine when desiring to signal an intended turn, an intended stop, or an intended reversal of the machine may extend his hand through the opening 6, the closure 7 moving outwardly to permit this as shown to advantage in Figure 4. As soon as the operator pulls his hand in the closure 7 closes, thereby preventing wind, snow, or the like from coming into the car.

I claim:—

In a window for use in automobiles or other vehicles, a panel connected to the window frame and having an opening located at about the level of the hand of the driver of the vehicle in the closed position of the window, a closure plate for said opening fitted on the outside of the panel, said closure plate being slightly larger than the opening and having its edges overlapping the edges of the panel surrounding the opening, an inwardly offset hanger carried by the closure plate and located on the inner side of the panel, means for pivotally mounting the hanger on the panel, said hanger having an upstanding flange, and a spring having one end fastened to the panel and having a portion engaged with the flange to urge the plate to closed position.

DARWIN H. DONACHY.